United States Patent Office 3,187,439
Patented June 8, 1965

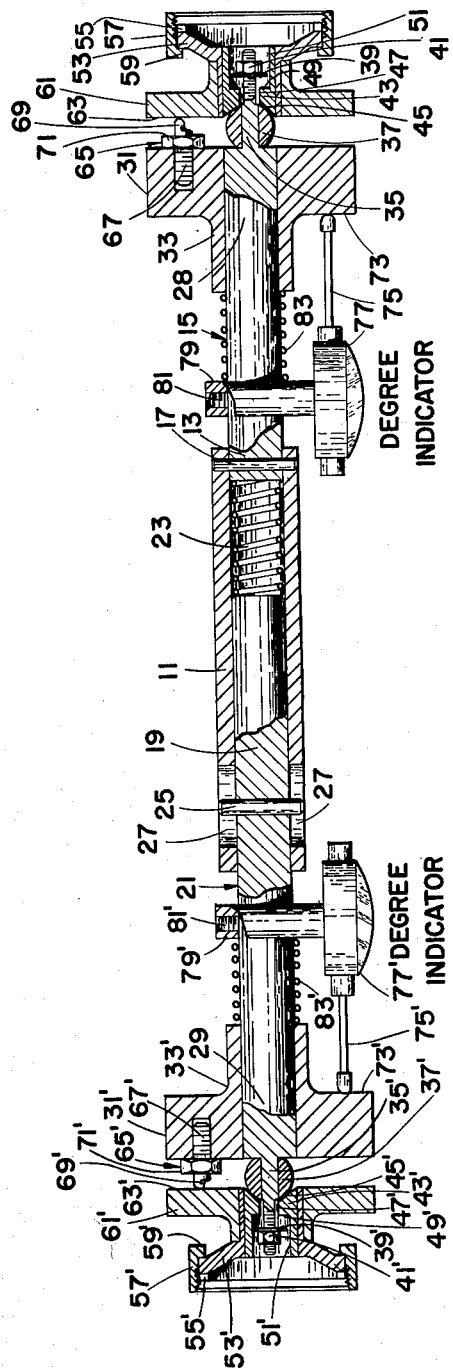

3,187,439
ALIGNMENT GAGE
Robert I. Leach, Clinton, N.Y., assignor to The Bendix Corporation, Utica, N.Y., a corporation of Delaware
Filed Apr. 28, 1961, Ser. No. 106,348
7 Claims. (Cl. 33—181)

This invention relates to measuring devices and is more particularly concerned with an alignment gage which is adapted to measure the small misalignment between a driving shaft and a driven shaft intended to be connected by a flexible drive shaft.

Flexible drive shafts having a flexible diaphragm assembly at each end are used to connect the output shaft of a prime mover such as an aircraft engine and the input shaft of a driven accessory such as a hydraulic pump. The output shaft of an aircraft engine pad will be on a center line which is not parallel to or aligned with the center line of the input shaft of a mounted accessory. It is necessary that, since perfect alignment on common center line is not realized and further since alignment on parallel center lines is not practical, the degrees of misalignment relative to the non-parallel center lines must be determined at each shaft whereby adjustments can be made. Such adjustments of the accessory mounting must accommodate a minimum misalignment for each end of the flexible drive shaft. With a flexible drive shaft such as disclosed in U.S. Patent #2,883,839, typical limits for misalignment are three and a half degrees maximum at one end permits only three degrees at the other end. It is apparent that there is a need for improved means for measuring misalignment at each shaft with adjustment of the accessory being possible with single measuring set-up.

An object of the present invention is to provide an improved measuring device for determining the respective misalignment at the output shaft of a prime mover and at the input shaft of a driven accessory for adjusting so that a double-flexed drive shaft can connect the output and input shafts.

A further object is the provision of such a measuring device which is low in cost, accurate and easily used.

Another object is to provide a gage for measuring the misalignment between a driving shaft and a driven shaft intended to be connected by a flexible drive shaft with the gage having means for translating a rotary motion to degrees of misalignment.

A further object is to provide such a gage wherein a collar is rotated relative to a surface which is perpendicular to the axis of a shaft and a resulting axial or linear travel is imparted to an actuator rod of a dial indicator.

An additional object is the provision of such a gage which also has means for calibrating a degree indicator by an arrangement of radially adjustable probe in a rotatable axially-movable collar.

The realization of the above objects along with the features and advantages of the invention will be apparent from the following description and the accompanying drawing.

The drawing is a partially-cross-sectioned top view of a gage embodying the present invention and shows spring-tensioned telescoping support means at the center and pivoted at each end a flat plate adapted to be perpendicular to the axis of a connected external shaft and a rotating sliding collar cooperating with the plate and arranged to actuate the stem of a dial-type degree indicator.

Referring to the drawing, a hollow support shaft or tube 11 at the center has the support end 13 of the right shaft 15 firmly mounted in the right end thereof by means of pin 17. The left end of the support shaft 11 has the support end 19 of the left shaft 21 slidably mounted therein. A coil spring 23 within support shaft 11 and confined axially by the two support ends 13 and 19 serves to tension the left shaft 21 away from the right shaft 15. Pin 25 extending through and projecting from support end 19 of the left shaft 21 fits into two elongated slots or openings 27 in support shaft 11 to provide means for limiting the leftward movement of the left shaft 21 so that the left shaft 21 remains connected to support shaft 11. With this telescoping arrangement, it is apparent that shafts 15 and 21 are maintained in alignment and can be urged toward each other so that devices pivoted at the connecting ends 28 and 29 opposite the support ends 13 and 19 can be attached to a driving or output shaft and a driven or input shaft in general alignment with the output shaft. Futher, the tensioning of coil spring 23 will assure that engagement is maintained at ball-socket coupling surfaces which will be described.

Since the means mounted on or connected to the connecting ends 28 and 29 of the right and left shafts 15 and 21 are identical, only the right one of such means will be described and like reference numerals with prime marks will be applied to the means at the left.

A collar 31 having an axially-inwardly-extending boss 33 is slidably and rotatably mounted on connecting end 28 of the right shaft 15. This connecting end 28 has an axial projection 35 extending to the right. A ball 37 is mounted on projection 35 which also has a washer 39 and lock nut 41 mounted on the end thereof spaced from ball 37. A plug 43 has a conical surface 45 contacting the ball 37 and an opening 47 surrounding shaft projection 35. Plug 43 also has a catch shoulder 49 between opening 47 and bore 51 which surrounds washer 39 whereby the shoulder 49 and washer 39 provide for a loose connection to projection 35 for holding parts when the gage is not in use. Plug opening 47 provides for pivoting of conical surface 45 on ball 37. A curvic coupling 53 is attached to the outer surface of plug 43 and has a ring of axially-extending curvic teeth 55 for connection to a driving or driven shaft member. Teeth 55 along with internally-threaded nut 57 mounted on the periphery of coupling 53 by annular shoulder 59 provides for firm attachment to an external shaft which has mating teeth and threads. A circular plate 61 providing an annular flat surface 63 facing collar 31 is mounted on coupling 53. It is to be noted that, when curvic teeth 55 are firmly engaged with a drive shaft by nut 57, the flat surface 63 is held perpendicular to the axis of the drive shaft or, stated differently, the flat surface 63 is parallel to the effective engagement surfaces of the attachment means which includes the curvic teeth 55.

Collar 31 carries a probe 65 extending axially for contacting the transverse or radial flat surface 63. Probe 65 has a cylindrical screw part 67 with an off-center axially-projecting element 69 arranged, when rotated, to contact different diameter circles on flat surface 63. A nut 71 locks probe 65 in position but permits radial adjustment of projection 69 for a purpose which will be described. It is apparent that, when plate 61 is axially-fixed but tilted in respect to the gage axis, the probe 65 will cause collar 31 to move axially when the collar 31 is rotated. Collar 31 is provided with a heavy knurl to facilitate such rotation.

Collar 31 has flat surface 73 at the side opposite probe 65 and an indicator actuating stem 75 contacts this radial surface 73 which is perpendicular to the axis of the gage. It is apparent that, when collar 31 is rotated as above mentioned, its rotary motion will translate into an axial or linear motion applied to spring-tensioned actuating stem 75. Stem 75 is operably connected to a conventional dial-type degree indicator 77 adapted to read a small number of degrees. Indicator 77 is mounted on the intermediate part of right shaft 15 by means of a bracket 79 which is mounted on shaft 15 and positioned by a set screw 81. A coil spring 83 surrounds shaft 15 and is confined by the right face of mounting bracket 79 and the end of boss 33 of collar 31. Spring 83 tensions collar 31 so that its probe 65 maintains contact with the flat surface 63 of plate 61.

As above mentioned, identical structure is associated with the left shaft 21 at the other end of the gage. Thus, both ends of the gage are provided with a tilt plate device having attachment means for connection to an external shaft. Each tilt plate device is pivotally connected to a gage shaft and provides a flat tilt surface which is adapted to be perpendicular to axis of the external shaft and tilted in respect to the gage axis. Each collar 31 or 31' cooperates with the adjacent tilt plate device to translate rotary motion to axial motion so that degree indicators 77 and 77' are actuated.

In use, the gage is shortened or compressed axially by sliding the left shaft 21 into support shaft 11 against spring 23. The gage is then placed in position with dial indicators 77 and 77' easily observable. For attachment to the input and output shaft members which are slightly misaligned on non-parallel axes, the nuts 57 and 57' are fastened firmly to the input and output shafts so that curvic teeth 55 and 55' cause flat surfaces 63 and 63' to be perpendicular to the respective axis of each toothed external shaft and tilted with respect to the axis of the gage. Spring 23 creates sufficient force on the ball and socket couplings to assure stability of the gage. Springs 83 and 83' assure that probes 65 and 65' are held in contact with the radial flat sides 73 and 73' of the collars 31 and 31'.

Referring specifically to the right end of the gage when in the above-described position, it is apparent that the flat surface 63 of plate 61 will be perpendicular to the axis of the attachment means provided by the curvic teeth 55 and hence the axis of the connected drive shaft member but that surface 63 will be tilted in respect to the axis of the gage and to surface 73 of collar 31. Full circle rotation of collar 31 with probe 65 contacting flat surface 63 of plate 61 causes axial motion of the collar 31 which is proportional to the amount of misalignment at the right end of the gage. This axial motion is transmitted by the flat radial side 73 of collar 31 to the actuating stem 75 which actuates the degree indicator 77. Thus, in order to obtain a reading in degrees at the right end, an operator rotates collar 31 through a full circle or three hundred and sixty degrees and observes the dial-type indicator 77. This operation is duplicated at the left end of the gage. If either reading exceeds the permissible limit, the accessory will be adjusted with the gage installed so that the misalignment at each end is within limits as determined by subsequent readings on the indicators 77 and 77'. With this arrangement in which rotary motion is translated to degrees of misalignment at each end, it is possible with single installation to adjust the relation between an output shaft member and an input shaft member on nonparallel axes so that a flexible drive shaft having flexible diaphragm assemblies at each end can be mounted between the shaft members. For purposes of calibration, the screw part 67 of the probe 65 can be rotated and relocked to move the probe contact projection 69 radially.

It is to be understood that persons skilled in the art can make changes in the disclosed embodiment of the invention without departing from the invention as set forth in the appended claims.

What is claimed is:

1. A gage for measuring the misalignment between an output shaft member and an input shaft member arranged to be connected by a flexible drive shaft comprised of a first shaft, a second shaft, a spring-tensioned telescoping means connecting said first and second shafts so that said first and second shafts are in axial alignment and are movable toward each other, each of said shafts having a connecting end spaced from said telescoping means, a tilt plate device pivotally connected to each connecting end and having attachment means for attaching the gage to and between an output shaft member and an input shaft member, each tilt plate device providing a flat surface at the adjacent connecting end and perpendicular to the axis of its attachment means, a dial-type degree indicator fixedly mounted on each of said shafts and having an actuating stem, means slidably and rotatably mounted on each of said shafts and constructed so that upon full circle rotation with contact with the adjacent flat surface when tilted said actuating stem is moved so that each degree indicator is operated.

2. A gage for measuring the misalignment between an output shaft member and an input shaft member arranged to be connected by a flexible drive shaft comprised of a first shaft, a second shaft, support means connecting said first and second shaft so that said first and second shafts are in axial alignment, each of said shafts having a connecting end spaced from said support means, attachment means connected by a ball and socket coupling to each connecting end for attaching the gage to and between an output shaft member and an input shaft member, plate means rigidly connected to one of said attachment means and providing a flat surface adjacent one of the connecting ends and perpendicular to the axis of the attachment means, degree measuring means mounted on the connecting shaft adjacent said plate means, said measuring means having probe means arranged to move axially when rotated a full circle in contact with said flat surface when said flat surface is tilted, said measuring means including a degree indicator operable by axial movement of said probe means to indicate the degrees of misalignment.

3. A gage for measuring the misalignment between an output shaft member and an input shaft member arranged to be connected by a flexible drive shaft comprised of a first shaft, a second shaft, a spring-tensioned telescoping means connecting said first and second shaft so that said first and second shafts are in axial alignment and are movable toward each other, each of said shafts having a connecting end spaced from said telescoping means, attachment means connected by a ball and socket coupling to each connecting end for attaching the gage to and between an output shaft member and an input shaft member, plate means rigidly connected to one of said attachment means and providing a flat surface adjacent one of the connecting ends and perpendicular to the axis of the attachment means, degree measuring means mounted on the connecting shaft adjacent said plate means, said measuring means having probe means arranged to move axially when rotated a full circle in contact with said flat surface when said flat surface is tilted, said measuring means including a degree indicator operable by axial movement of said probe means to indicate the degrees of misalignment, said probe means having a radially adjustable projection in contact with said flat surface whereby said degree indicator can be calibrated.

4. A gage for measuring the misalignment between an output shaft member and an input shaft member arranged to be connected by a flexible drive shaft comprised of a first shaft, a second shaft, a spring-tensioned telescoping means connecting said first and second shaft so that said first and second shafts are in axial alignment and are movable toward each other, each of said shafts having a connecting end spaced from said telescoping means, attachment means connected by a ball and socket coupling to each connecting end for attaching the gage to and between an output shaft member and an input shaft member, plate means rigidly connected to each of said attachment means and providing a flat surface adjacent each of the respective connecting end and perpendicular to the axis of each respective attachment means, a collar mounted on each of said connecting shafts, a probe projecting from each collar for contact with the adjacent one of said flat surfaces, each of said collars having a flat radial side opposite said probes and perpendicular to the respective shaft, a dial-type degree indicator fixedly mounted on each of said shafts and having an actuating stem for contact with each of said radial sides of said collars, said collars being slidably and rotatably mounted on said shafts so that upon full circle rotation of said collars with said probes in contact with said flat surfaces the radial sides of said collars will impart axial motion to said actuating stems of said indicators whereby the degrees of misalignment at each end of the gage can be determined.

5. In an alignment measuring device for determining the misalignment between an output shaft member and an input shaft member arranged to be connected by a flexible drive shaft, attachment means constructed to be attached to a shaft member, plate means rigidly connected to said attachment means and providing a flat surface perpendicular to the axis of said attachment means, a shaft, a ball and socket coupling connecting said shaft to said attachment means, a collar slidably and rotatably mounted on said shaft and having a probe projecting from one side arranged to contact said flat surface, a degree indicator having stem contacting the other side of said collar, said other side of said collar being perpendicular to said shaft, said collar being rotatable a full circle with said probe in contact with said flat surface whereby, when said flat surface is tilted in respect to the axis of said shaft, full rotary motion of said collar will axially move said collar and said degree indicator stem and hence said indicator will show the degrees of misalignment between the axis of said attachment means and the axis of said shaft.

6. A gage for measuring the misalignment between the output shaft of a prime mover and the input shaft of a driven accessory comprised of a hollow support shaft, a first shaft having a connecting end an a support end, said first shaft support end being connected to one end of said hollow support shaft, a second shaft having connecting end and a support end, said second shaft support end being slidably received in the other end of said hollow support shaft, a coil spring within said hollow support shaft confined between said first shaft support end and said second shaft support end, said second shaft being limitedly slidable into and out of said hollow support shaft against said coil spring, a plate device being pivotally connected to each of said shafts and having flat radially-extending surface, said plate device having attachment means for firmly connecting said plate device to an external shaft so that said plate device is held perpendicular to the shaft, each of said shaft connecting ends having a collar rotatably and slidably mounted thereon, each collar having a probe element projecting toward said flat radially-extending surface of the adjacent plate device for contact therewith, spring means urging each collar toward the adjacent plate device so that said probe element contacts said flat surface when said collar is rotated, each collar having a radially-extending surface opposite said probe element, each of said first and second shafts having a degree indicator mounted thereon, each degree indicator having an actuating element extending to the flat surface of the adjacent collar.

7. A gage for measuring the misalignment between the output shaft of a prime mover and the input shaft of a driven accessory comprised of a hollow support shaft, a first shaft having a connecting end and a support end, said first shaft support end being connected to one end of said hollow support shaft, a second shaft having connecting end and a support end, said second shaft support end being slidably received in the other end of said hollow support shaft, a coil spring within said hollow support shaft confined between said first shaft support end and said second shaft support end, said hollow support shaft having an axially-extending opening, said second shaft having a pin projecting radially into said opening of said hollow support shaft so that said second shaft is limitedly slidable into and out of said hollow support shaft against said coil spring, each of said shaft connecting ends having a reduced-diameter axial projection, a ball element mounted on each of said axial projections, each of said projections extending beyond said ball and having a washer mounted thereon, a plate device loosely mounted on each of said projections axially limited by the adjacent washer, said plate device having flat radially-extending surface and inwardly thereof a conical surface constructed to ride on said ball element, said plate device having attachment means for firmly connecting said plate device to an external shaft so that said plate device is held perpendicular to the shaft, each of said shaft connecting ends having a collar rotatably and slidably mounted thereon adjacent said ball element, each collar having a probe projecting toward the adjacent flat radially-extending surface for contact therewith when said plate device contacts said ball element, spring means urging each collar toward each plate device so that said probe contacts said flat surface when said collar is rotated, each collar having a radially-extending surface opposite the adjacent probe, each of said first and second shafts having a degree indicator mounted thereon, each degree indicator having an actuating element extending to the adjacent flat surface of the respective collars, each probe having a radially adjustable projection contacting said flat surface of said plate device whereby each degree indicator can be calibrated.

References Cited by the Examiner
UNITED STATES PATENTS

| | | | |
|---|---|---|---|
| 685,288 | 10/01 | Miller | 33—181 |
| 2,516,854 | 8/50 | Christian | 33—180 |
| 2,700,224 | 1/55 | Johnson | 33—174 X |

ISAAC LISANN, *Primary Examiner.*

ROBERT EVANS, *Examiner.*